United States Patent [19]
Peltzman et al.

[11] Patent Number: 4,537,736
[45] Date of Patent: Aug. 27, 1985

[54] METHOD FOR CURING A FLEXIBLE HOSE

[75] Inventors: William S. Peltzman, Northglenn; Raymond A. Rohlfing; Charles C. Gates, Jr., both of Denver, all of Colo.

[73] Assignee: The Gates Rubber Company, Denver, Colo.

[21] Appl. No.: 544,026

[22] Filed: Dec. 5, 1983

Related U.S. Application Data

[62] Division of Ser. No. 385,169, Jun. 4, 1982, abandoned.

[51] Int. Cl.$^3$ .............................................. B29C 25/00
[52] U.S. Cl. .................................... 264/130; 264/166; 264/173; 264/209.3; 264/233; 264/236; 264/295; 264/300; 264/338; 264/339; 264/347
[58] Field of Search ................. 264/130, 166, 209.3, 264/236, 295, 300, 338, 339, 347, 173, 233

[56] References Cited

U.S. PATENT DOCUMENTS

| | | | |
|---|---|---|---|
| 2,690,592 | 10/1954 | Schanz | 264/130 |
| 2,964,796 | 12/1960 | Press | 264/339 |
| 3,183,288 | 5/1965 | Taylor et al. | 264/130 |
| 3,231,442 | 1/1966 | Michael | 264/338 |
| 3,424,607 | 1/1969 | Coscia | 264/338 |
| 3,532,537 | 10/1970 | Richards | 264/300 |
| 3,595,950 | 7/1971 | Mezynski | 264/130 |
| 3,682,202 | 8/1972 | Buhrmann et al. | 264/347 |
| 3,972,757 | 8/1976 | Derderian et al. | 264/347 |
| 3,992,505 | 11/1976 | Tally | 264/339 |
| 4,106,967 | 8/1978 | Logan et al. | 264/173 |
| 4,106,968 | 8/1978 | Kutnyak et al. | 264/339 |
| 4,110,396 | 8/1978 | Reynolds | 264/339 |
| 4,118,162 | 10/1978 | Baumgarten | 264/209.3 |
| 4,155,790 | 5/1979 | Galloway | 264/347 |
| 4,158,586 | 6/1979 | Usui | 264/236 |
| 4,205,034 | 5/1980 | Newberry | 264/339 |
| 4,311,547 | 1/1982 | Biggs et al. | 264/236 |
| 4,360,492 | 11/1982 | Rowland et al. | 264/236 |

FOREIGN PATENT DOCUMENTS

| | | | |
|---|---|---|---|
| 2705459 | 8/1978 | Fed. Rep. of Germany | 264/166 |
| 0079956 | 7/1978 | Japan | 264/347 |
| 0028849 | 2/1980 | Japan | 264/130 |

Primary Examiner—Jeffery Thurlow
Assistant Examiner—Patrick Dailey
Attorney, Agent, or Firm—H. W. Oberg, Jr.; C. H. Castleman, Jr.

[57] ABSTRACT

A method for making curved hose using a curved mandrel by applying a melted material to an inside surface of an uncured hose and solidifying the material. The material is remeltable and forms a lubricant when the hose is pushed onto and removed from a hot curved mandrel.

6 Claims, 4 Drawing Figures

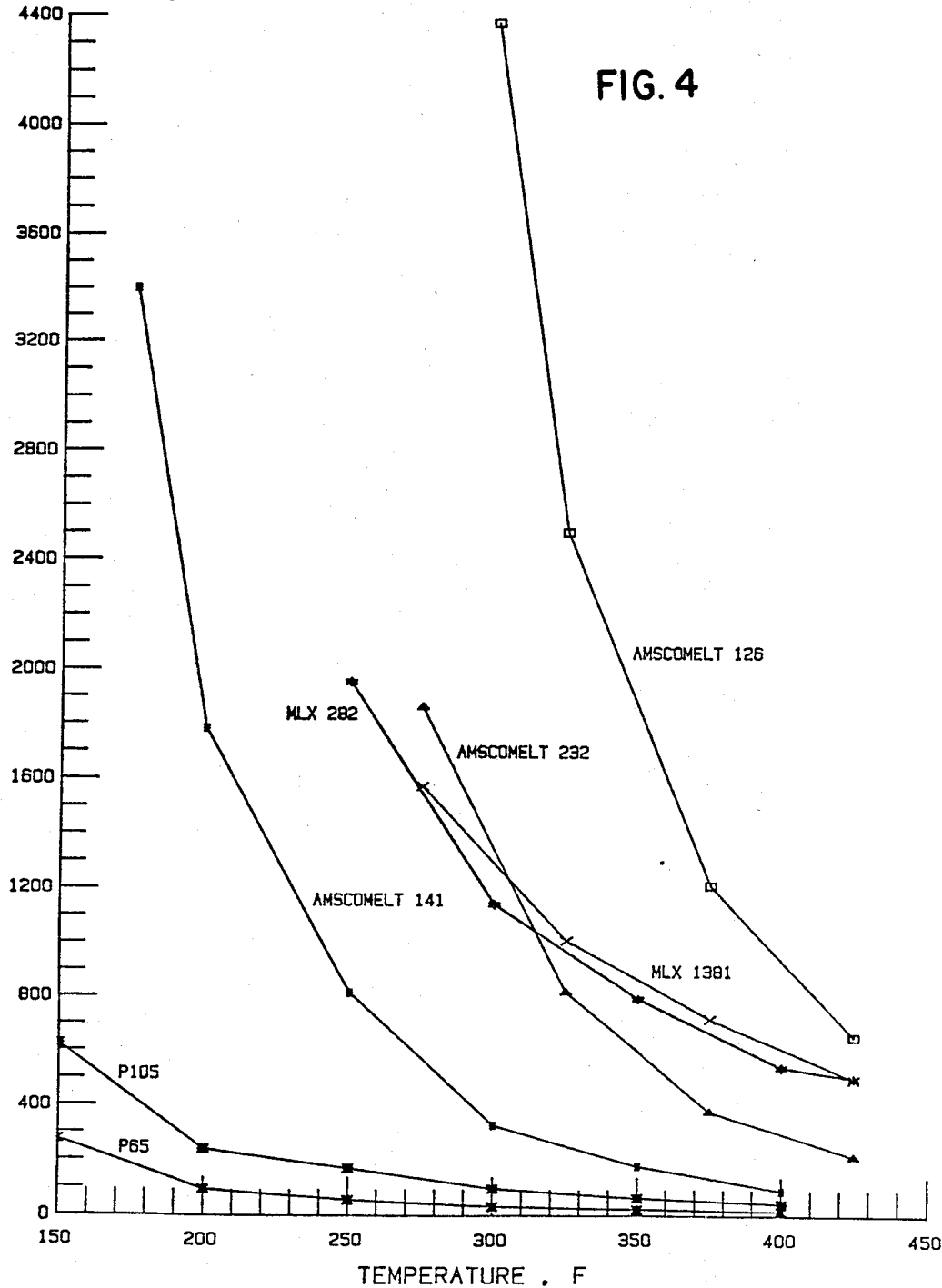

METHOD FOR CURING A FLEXIBLE HOSE

This is a division of application Ser. No. 385,169, filed June 4, 1982 now abandoned, as continued in application Ser. No. 614,377, filed May 24, 1984.

BACKGROUND OF THE INVENTION

The invention relates to elastomeric hose, but more particularly, the invention relates to hose with a heat cure type elastomeric tube that is cured while positioned on a mandrel that may have several bends.

Curved hose is manufactured by positioning a pre-cut length of uncured hose over a curved mandrel and then heating and curing the hose to retain a curved shape. The hose may solely comprise an elastomeric tube, or the hose may comprise an elastomeric tube surrounded by a twined reinforcement. Optionally, a cover may surround the reinforcement. Uncured elastomeric hose made from rubber has a tendency to flaten as the tube is coiled when the inside tube diameters are about one inch or greater. A partitioning agent such as mica dust is sprayed on the inside of the tube during extrusion to prevent the tube from cohering when flattened.

Lengths of uncured tube are at least partially dipped into a lubricant before they are positioned on a mandrel. The lubricant is required to slide an uncured hose over the mandrel and to remove a heat cured hose from the mandrel.

A cured hose is substantially cleaned of mica dust and lubricant before it is put in service. Residual amounts of mica dust and lubricant must be compatible with the equipment service by the hose such as an automobile cooling system.

Accordingly, the chosen lubricant must aid in sliding an uncured hose on a mandrel, it must not appreciably deteriorate as the hose is cured on the mandrel; it must aid in removing a cured hose from the mandrel; and it must be able to be substantially removed from a curved hose after curing. One lubricant that has found widespread use in curved hose making is a water soluble oil having an ethylene glycol base and sold under the Trade Name "Ucon" by Union Carbide Corporation. Most of the Ucon oil and mica dust is removed from the hose with a water solution wash. Some oil is extracted from the water solution and recovered while small residual portions are retained by the finished hose product.

While mica dust and "Ucon" oil type lubricant are acceptable processing aids to produce a satisfactory hose product, their introduction into the processing steps have several drawbacks. Both, whether introduced individually or together, must be substantially removed from a cured hose to produce a satisfactory end product. The water soluble oils have a tendency to retain oxygen molecules. When a water and combination contacts production equipment, it contributes to rapid corrosive decay of such equipment.

SUMMARY OF THE INVENTION

In accordance with the invention, a hose of the variety having a heat cure type elastomeric tube is provided with a remeltable layer that coats at least a portion of the tube inside surface. The remeltable layer is pliant while in a solid form at temperatures up to at least about 85° and is lubricious while in a melted or softened form at elastomeric tube heat cure temperatures. Preferably, the remeltable layer is substantially uncohesive while in solid form.

The remeltable layer establishes a basis for a hose processing which eliminates the requirement to clean either or both mica dust or lubricant from a cured hose. The remeltable layer is softened by a heated mandrel and changed to a lubricant as a length of uncured hose is slid over the mandrel. The hose is heat cured and the remeltable layer again acts as a lubricant that aids in removing the cured hose from a mandrel. The layer solidifies as the hose is cooled. Preferably, the layer is applied in such minute quantities that it is unnecessary to remove it from the hose.

The above and other advantages of the invention will be apparent after reviewing the drawings and description thereof wherein:

FIG. 4 is a chart showing the viscosities of several remeltable materials at various temperatures.

DESCRIPTION OF PREFERRED EMBODIMENTS

Article

Figure 1:
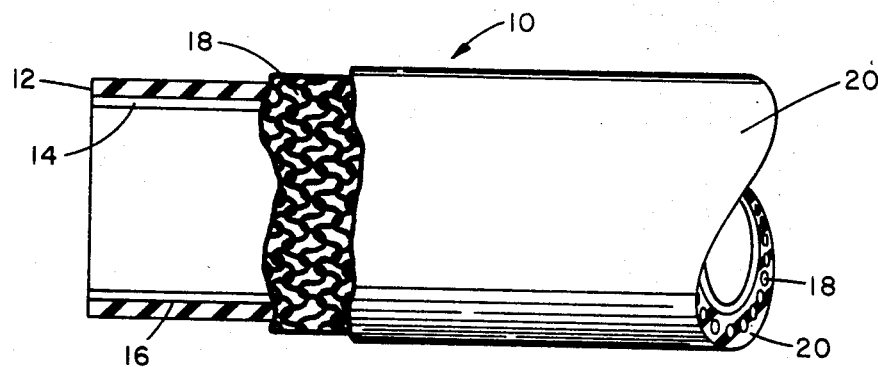
FIG. 1 is a partially cutaway side view of a hose of the invention.

Referring to the drawings, the hose 10 of the invention comprises a heat cure type elastomeric tube 12 having a remeltable layer 14 that coats at least a portion of the tube inside surface 16. Optionally, a twined textile such as a knitted yarn may be used as a tube reinforcement 18. The twined reinforcement 18 may define the hose exterior surface, or, optionally, a heat cure type elastomeric cover 20 may be used to surround the reinforcement.

The tube and cover is made of any desirable heat cure type elastomeric material such as the natural or synthetic rubbers and blends thereof. Such material cures or vulcanizes at temperatures from about 200° F. to about 400° F. Of course, the selected cure temperature is time dependent.

The remeltable layer 14 is in a pliant and substantially solid form at factory environment temperatures, as for example about 85° F., and is in a lubricious melted form at elastomeric tube heat cure temperatures. The remeltable layer coats at least a portion of the tube inside surface, as by dipping or swabbing, but more preferably, the remeltable layer is initially applied while in melted form in the tube inside surface. The layer optionally has a thickness less than about 0.015 inch and more preferably, somewhere about 0.002 inch. Optionally, but preferably, the remeltable layer is coextruded with the uncured elastomeric tube.

In addition to the requirement that the layer 14 be remeltable, pliant in solid form, and lubricious in melted form at elastomer tube cure temperatures, it is also desirable that the layer have a melting temperature from about 85° F. to about 200° F. and have a viscosity less than about 4,000 cps at a temperature up to about 400° F. More preferably, the remeltable layer exhibits uncohesiveness while in solid, pliant form, is chemically stable up to temperatures of about 500° F., and, when melted, exhibits a lubricity by its adherence to elastomers and metals selected from the group of aluminum and iron. The layer preferably has a viscosity of about 100 cps at a temperature of about 300° F. and a melting temperature starting at about 108° F. The layer may be water soluble.

The remeltable layer may be made from a variety of materials from substantially different chemical compositions provided that the material exhibit some of the above-mentioned physical properties.

For the purpose of this disclosure, the following terms are used to identify the attributes of the layer of material 14:

The term "remeltable" is used to include a condition where the layer of material softens with application of heat to a point that allows flowing of the material for lubricity;

The phrase "pliant while solidified" is used to denote sufficient adhesion of the layer of material to portions of the tube inside surface so that the material substantially stays in place; however, there may be some cracking of the material to enable a pliancy that accommodates hose coiling. Thicker layers of some remeltable materials may have more of a tendency to crack than a thinner layer of the same material;

The term "solid" is intended to include a material in a highly viscous "greasy state" where lubricity is not yet enhanced by application of heat; however, the material may have a "tacky" feel; and The phrase "uncohesive while solidified" is used to denote a material surface condition where the material might have a "tacky feel" but where the material has insufficient cohesion to adhere a flattened tube together.

There are several groups of satisfactory materials. One group of suitable materials comes from a category known as "hot melt adhesives". Many hot melt adhesive formulations are protected by trade secrets and, therefore, are sold by a manufacturer under a trade name or number. Examples of some hot melt adhesives that have been used to form the remeltable layer 14 and some of their physical characteristics are listed below:

| Trade Name | Manufacturer | Chemical Name | Approximate Softening or Melting Point |
|---|---|---|---|
| Amscomelt 126 | Union Oil Chemical Company of California | Hot Melt Adhesive | 167° F. |
| Amscomelt 141 | Union Oil Chemical Company of California | Hot Melt Adhesive | 164° F. |
| Amscomelt 232 | Union Oil Chemical Company of California | Hot Melt Adhesive | 184° F. |
| Nicomelt P1685 | Malcolm Nicol and Company Inc. | Remoistureable hot melted adhesive | 208° F. |
| Nicomet P1774 | Malcolm Nicol and Company Inc. | Remoistureable hot melted adhesive | 167° F. |

Some water soluble grease and wax materials have been used with some degree of success in forming the remeltable layer of which the following are examples:

| Trade Name | Manufacturer | Chemical Name | Approximate Softening or Melting Point |
|---|---|---|---|
| MLX 282 | Union Carbide Corporation | Polyglycol Grease | Not Applicable |
| MLX 1381 | Union Carbide Corporation | Polyglycol Wax | 153° F. |

Water soluble synthetic detergents have also been used with some degree of success to form the remeltable layer and examples of which are as follows:

| Trade Name | Manufacturer | Chemical Name | Approximate Softening or Melting Point |
|---|---|---|---|
| Pluronic P-65 | BASF Wyandotte Corporation | Polyglycol Paste* | 86° F. |
| Pluronic P-105 | BASF Wyandotte Corporation | Polyglycol Paste* | 108° F. |

*Polyoxyethylene - polyoxypropylene block polymer

As mentioned, all of the above materials have been used with some degree of success in forming the remeltable layer. Some of the materials are better than others in terms of ease of hose manufacture, durability, or cost. For example, Amscomelt 232, MLX 282, and Pluronic P-105 lend themselves to being and have been coextruded with the hose tube. Of the above-listed materials, Pluronic P-105 is a more preferred material because of some of its inherent physical characteristics. For example: it has a generally constant viscosity over a wide temperature range associated with heat curing hose; it is coextrudable with a tube to a thickness from about 0.001 inch to about 0.015 inches or greater; it is lubricious as characterized by its ability to wet a metallic mandrel such as made of iron or aluminum as well as its ability to wet the inside surface of a tube when melted; and it appears chemically stable at temperatures as high as 500° F.

While viscosity per se is not a measure of lubricity, viscosity is a helpful paremeter to consider when evaluating ease of a hose manufacturing process. FIG. 4 is a chart showing relative viscosity of some of the above listed materials at various temperatures that would correspond to manufacturing hose. A Brookfield Thermosel is used to measure viscosity in accordance with ASTM Procedure D3236-73. Viscosity gives some indication of temperature sensitivity that affects processing. For example, Pluronic P-65 and 105 have generally a constant viscosity over a large temperature range. Comparatively, the viscosity of Amscomelt 126 increases rapidly over a small temperature range. Generally speaking, it takes a higher axial force to install and remove a hose having a layer of high viscosity material than it does to remove a similar hose from a similar mandrel where the remeltable layer has a lower viscosity. Of course, this relationship does not bear on lubricity.

Method

A hose is made by extruding a tube of heat curable elastomer. As previously mentioned, the tube may comprise the entire hose product. More commonly, a reinforcement is twined over the tube and a cover is extruded over the twined reinforcement. The meltable layer is placed on the inside of the tube in any desired manner. The material forming the layer is heated and melted so that it may be easily positioned along at least an inside portion of the tube. The melted material may be coated by daubing, swabbing, or immersing and the like, but more preferably, the remeltable layer of material is coextruded with the elastomeric tube so that it at least coats a portion of the inside surface of the tube, and more preferably, substantially the entire portion of the tube inside surface. The remeltable layer solidifies as it and the extruded elastomeric tube cools. The so-formed uncured hose (or tube) with remeltable layer is ready for curing such as by vulcanization. The uncured hose is optionally cut to predetermined lengths so that it may be positioned on a mandrel of known length. The mandrel may be straight or curved.

Figure 2:
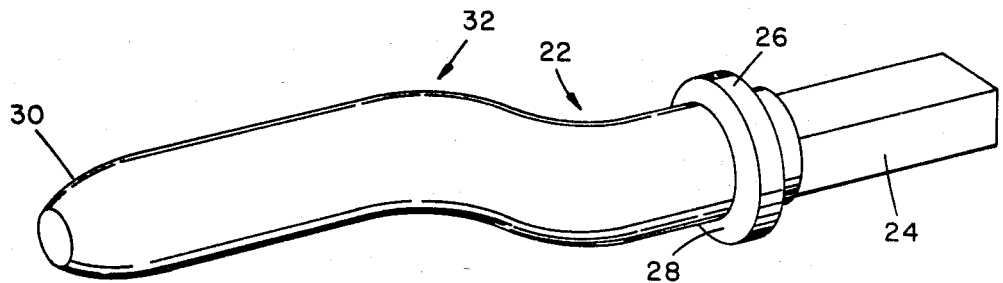
FIG. 2 is an isometric view of a prior part curved hose mandrel.
Figure 3:
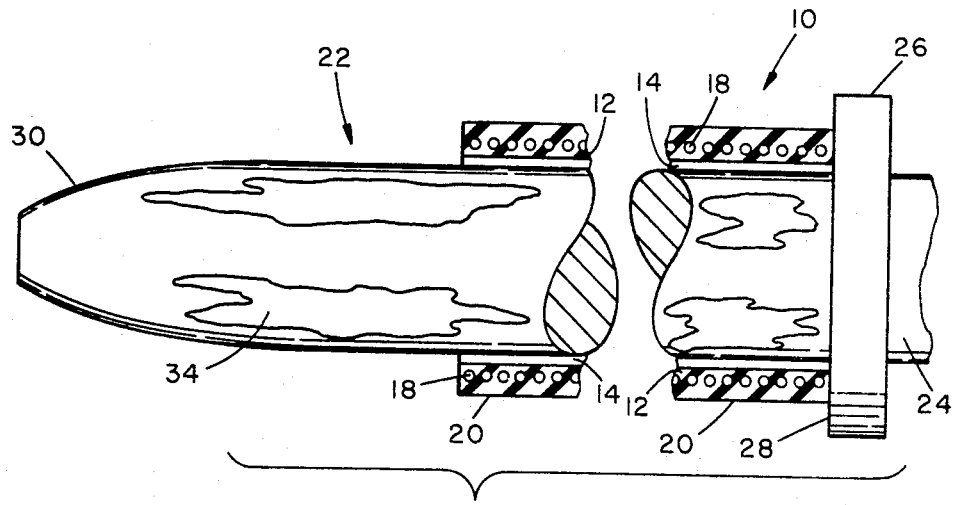
FIG. 3 is a partially cutaway and broken view showing a length of hose positioned in the mandrel shown in FIG. 2.

Referring to FIG. 2, a curved cylindraceous mandrel 22 for shaping an uncured hose is shown. The mandrel has means at one end for supporting the mandrel during use. For example, the mandrel may include a squared end 24 or another device for fastening the mandrel to a rack (not shown). A collar 26 may be provided near the mandrel mounting means and it defines a radial molding surface 28 for engaging a hose.

The free or open end of the mandrel is preferably rounded or tapered 30 to facilitate easy insertion of the mandrel unto the hose.

The mandrel is heated to a temperature that is above the melting or softening point of the remeltable layer.

A length of hose is placed over the mandrel and the heated mandrel melts the reltable layer turning it into a lubricant that facilitates easy positioning of the length of hose over the mandrel. As the hose is axially pushed over the mandrel, outside bends 32 generate a high wiping pressure against an inside surface portion of the hose. A remeltable material that exhibits good lubricious qualitities is not easily wiped dry of either the hose or the mandrel during this process.

The hose with mandrel therein is heated to a cure temperature for a period of time necessary to adequately cure the hose. The cured length of hose is then removed from the mandrel while the mandrel is hot and the layer of material is melted and in lubricious form to facilitate easy removal of the cured hose from the mandrel. The cured length of hose is then cooled causing solidification of any remaining portions of the elastomeric layer. During the process, some residual portions 34 of the remeltable layer 14 may collect and remain on the mandrel. Of course, this then aids in the installation of a subsequent piece of uncured hose.

As previously mentioned, some of the materials used for the remeltable layer may not be compatible with the hose produce during final use. Any remaining portions of the layer may be removed. Water soluble layers are obviously preferred so that the layer may be washed from the hose with a hot water solution. Optionally, some of the layer may be squeezed from the hose when the layer is in melted form.

The foregoing method eliminates any need to wash mica dust from the hose when the layer of material is sufficiently uncohesive to preclude a flattened tube from sticking to itself. A layer from about 0.001 to about 0.005 inches thick may need not be washed from a hose which, avoids cleaning the hose. Support materials and production equipment need no longer be drenched with a liquid lubricant that contains corrosive oxygen. Thus, prolonged life of support equipment is realized when a remeltable layer is directly extruded along the inside portion of the tube.

The foregoing detailed description is made for purpose of illustration only and is not intended to limit the scope of the invention which is to be determined from the appended claims.

What is claimed is:

1. A method for heat curing a flexible hose using a curved metallic mandrel comprising the steps of:
    extruding an elastomeric tube that is heat curable at temperatures from about 200° F. to about 400° F. while simultaneously:
    heating a remeltable material characterized as pliant while in solid form and lubricious while in melted form;
    melting the material starting at a temperature below about 210° F.; and
    coating at least a portion of an inside of the tube and forming a layer of melted material;
    cooling the tube while simultaneously solidifying the material and forming a layer of solidified material;
    heating a curved mandrel to a temperature that is above the material melting temperature, the mandrel of appropriate size to fit inside the tube;
    pushing and sliding a length of tube over the mandrel while simultaneously remelting the layer of solidified material with the heated mandrel and thereby lubricating the mandrel with the remelted material for easily receiving the length of tube;
    curing the length of tube on the heated mandrel;
    pulling and sliding the cured length of tube from the mandrel while the mandrel and tube are hot and the layer of material is still melted and in lubricious form; and
    cooling the cured length of tube.

2. The method as claimed in claim 1 which further includes the step of:
    removing most of the remaining portions of the layer of material.

3. The method as claimed in claim 1 which further includes the step of:
    removing most of the remaining portions of the layer of material by washing the cured length of tube in a water-based solution.

4. The method as claimed in claim 1 which includes the step of:
    coating at least a portion of the tube with a layer of material selected from the group consisting of hot melt adhesives,
    polyglycol grease, polyglycol wax, and polyoxyethylene-polyoxypropylene block polymer.

5. The method as claimed in claim 1 which includes the step of:
    coating at least a portion of the tube with a layer of material having a thickness up to about 0.015 inches.

6. The method as claimed in claim 1 which further includes the step of:
    extruding the remeltable material while coating at least a portion of the tube inside surface.

* * * * *